Nov. 10, 1936.    H. R. PERRY ET AL    2,060,744
CONVEYER SYSTEM
Filed Oct. 30, 1933    7 Sheets-Sheet 1
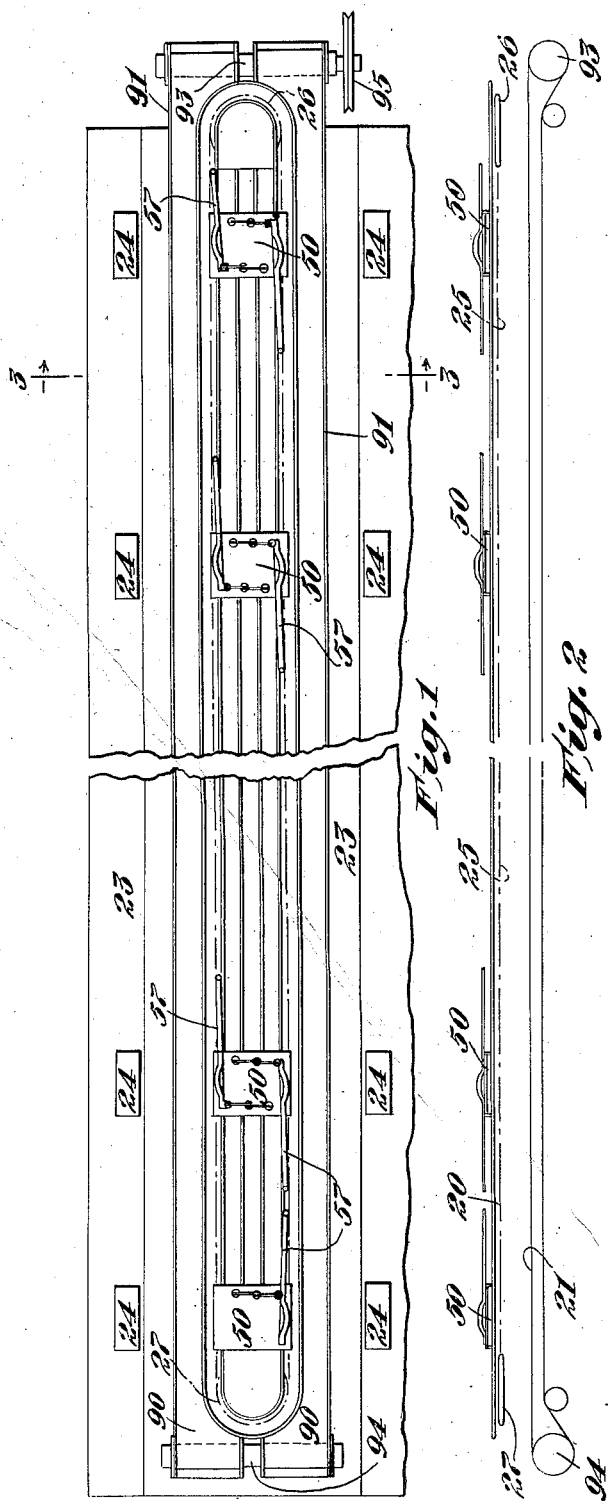
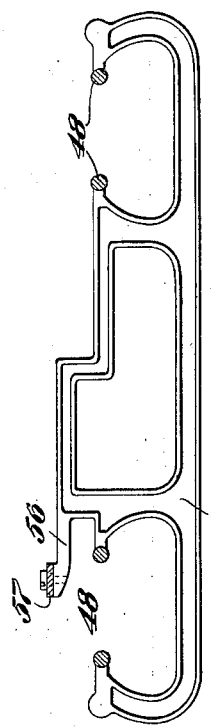
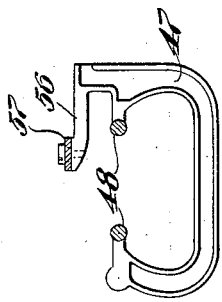
Inventors
Harold R. Perry
Chester S. Jennings
Roberts, Cushman & Woodbury.
Att'ys.

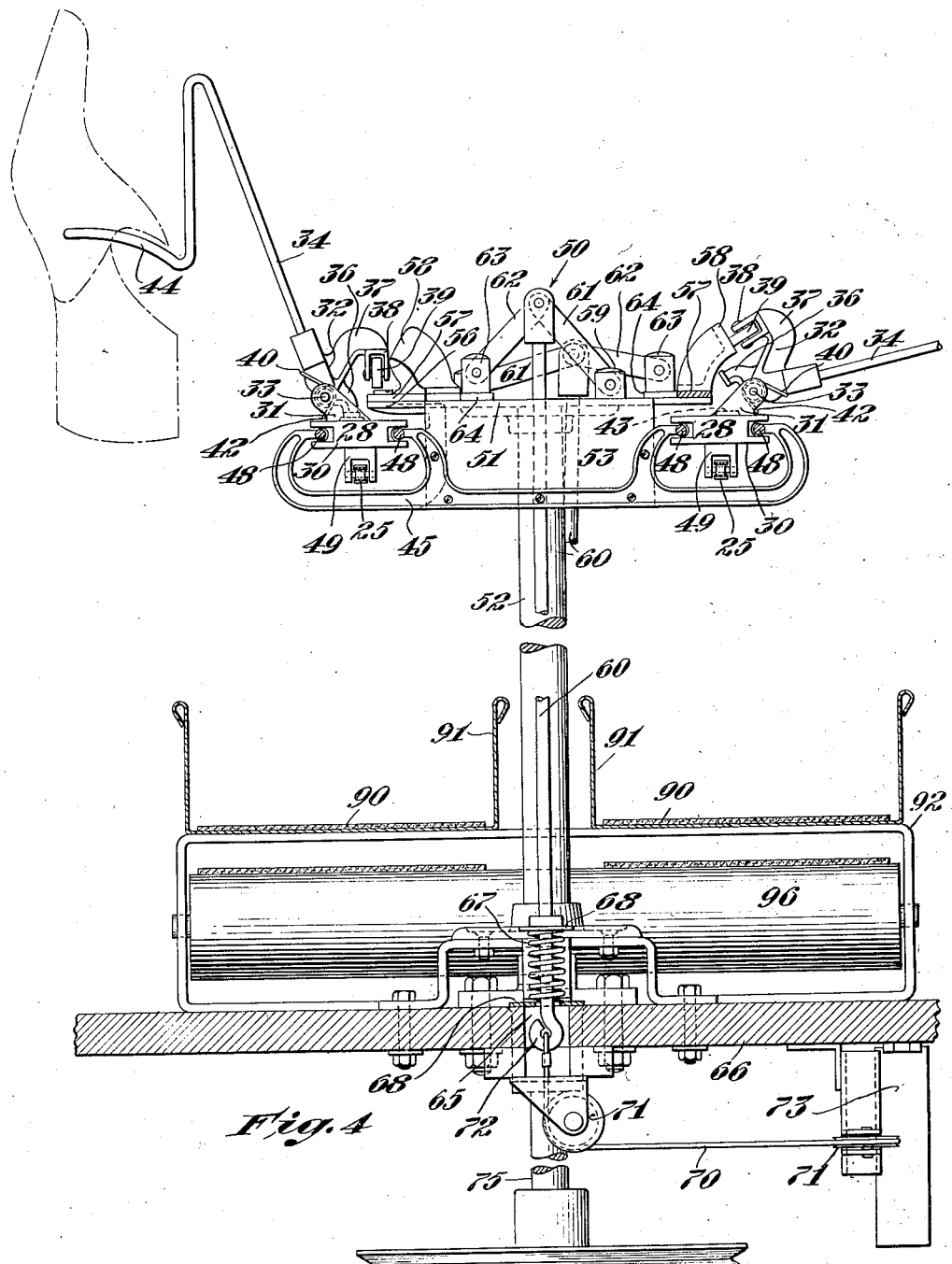

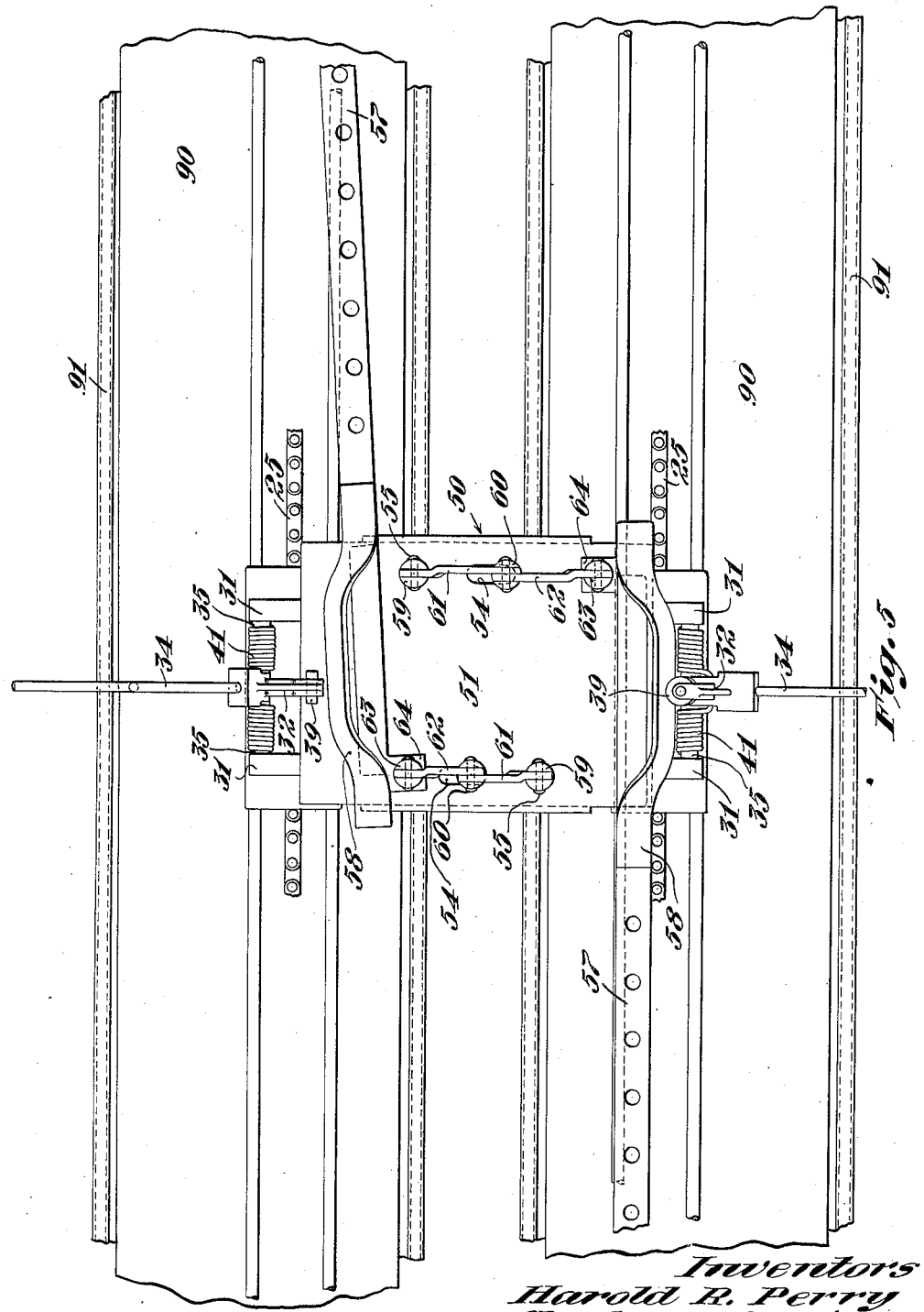

Nov. 10, 1936. H. R. PERRY ET AL 2,060,744
CONVEYER SYSTEM
Filed Oct. 30, 1933 7 Sheets-Sheet 5
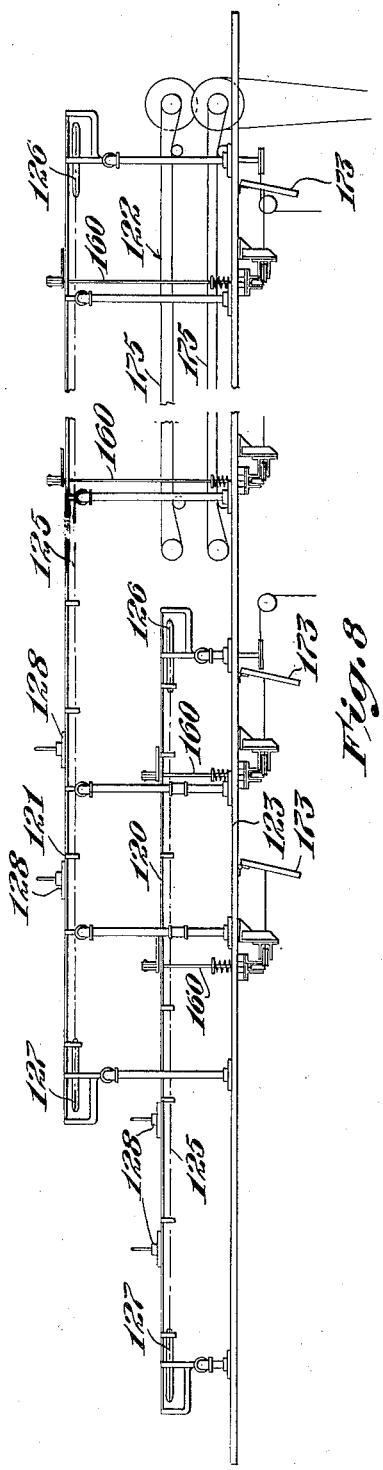
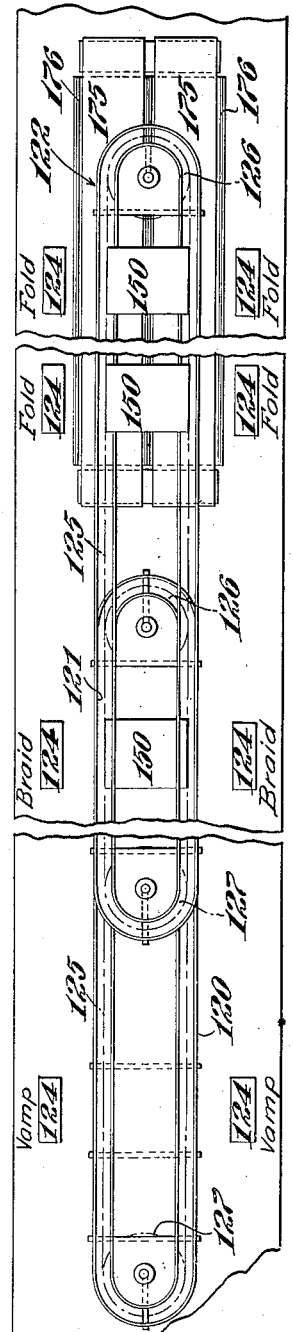

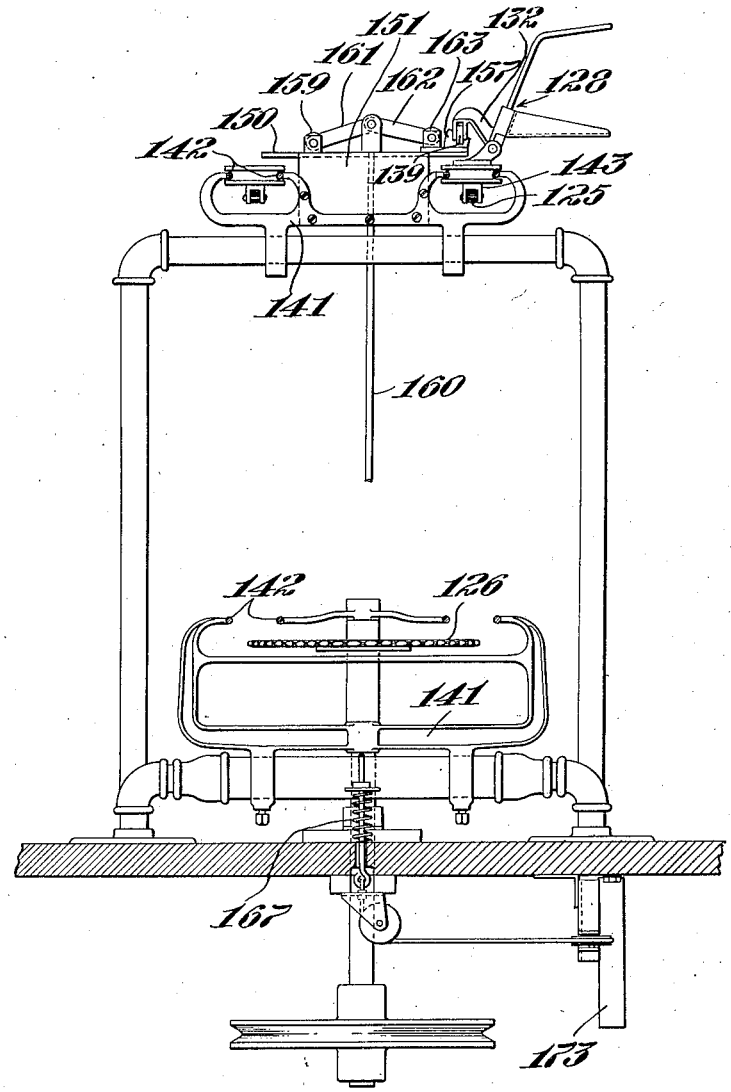

Nov. 10, 1936.   H. R. PERRY ET AL   2,060,744
CONVEYER SYSTEM
Filed Oct. 30, 1933   7 Sheets-Sheet 7

Inventors
Harold R. Perry
Chester S. Jennings
by Roberts, Cushman & Woodbury
Att'ys Patented Nov. 10, 1936

2,060,744

UNITED STATES PATENT OFFICE 2,060,744

CONVEYER SYSTEM

Harold R. Perry, Swarthmore, Pa., and Chester S. Jennings, Syracuse, N. Y., assignors to The Lamson Company, Syracuse, N. Y., a corporation of Massachusetts Application October 30, 1933, Serial No. 695,856

10 Claims. (Cl. 198—19)

This invention relates to an improvement in a conveyer system and has for its primary object the provision of a system comprising a plurality of conveyers by which work is transported to a plurality of operators for treatment thereby and is thereafter transported from such operators to a predetermined destination.

A further object of this invention is the provision of cars for the work mounted upon a conveyer in combination with means controlled by any operator for causing said cars to deliver the work upon their arrival at such operator's station.

Other objects will appear from a consideration of the following description and of the accompanying drawings which form a part thereof and in which:

Fig. 1 is a plan view of a system embodying one form of this invention;

Fig. 2 is a side elevation thereof;

Fig. 4 is a section taken through one of the stations of the system showing one car in the work carrying position and a portion of another car in the work delivering position;

Fig. 5 is a plan view of a typical station;

Figs. 6 and 7 illustrate in elevation two elements of the system;

Figs. 8 and 9 illustrate in side elevation and plan respectively a system embodying a second form of this invention;

Fig. 10 is a cross-sectional view illustrating a station on one conveyer and the driving end of another conveyer of said second embodiment;

Figure 3:
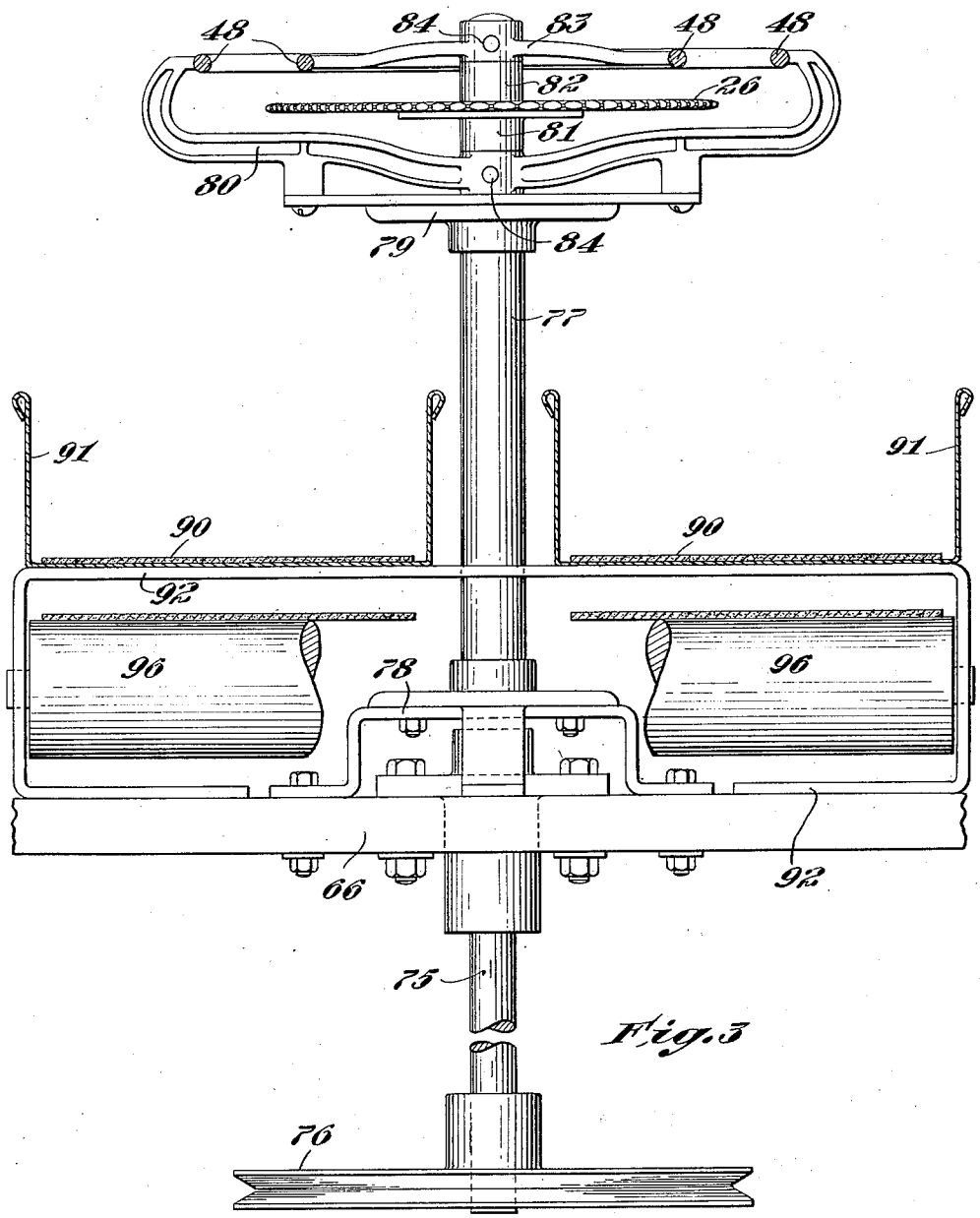
Fig. 3 is an enlarged cross-sectional view taken along the line 3—3 in Fig. 1, to illustrate the drive end of one conveyer and an intermediate portion of another conveyer.

The system shown in Figs. 1 to 7 inclusive comprises a primary conveyer 20 and a secondary conveyer 21, said conveyers overlapping vertically and being supported in a suitable frame over a work table 23. Rectangles 24 indicate diagrammatically the location of operators' benches arranged longitudinally at either side of the conveyers. The conveyer 20 comprises an endless chain 25 which is supported by head and foot sprockets 26, 27 and travels in a horizontal plane. Fixed to the chain 25 at predetermined distances apart are cars 28 by which work in progress is transported.

The cars here shown each comprise a base 30 having a pair of ears 31 projecting upwardly from the top surface, a lever 32 pivotally supported by the ears 31 on a shaft 33 and a finger 34 carried by the lever 32. The lever 32 includes a pair of sleeves 35, a foot 36 and an arm 37 terminating in a yoke 38 by which a roller 39 is supported. The sleeves 35, foot 36, arm 37 and yoke 38 may be, as here shown, integral parts of the lever. A spring 40, comprising coils 41 which surround the sleeves 35, a central loop, which is passed in front of the main body of the lever 32, and ends 42, which are passed in front of the ears 31, normally holds the lever and its associated elements in the position shown at the left in Fig. 4, with the foot 36 resting upon a boss 43 formed in the base 30. The illustrated embodiment is intended to be used in the transportation of shoe uppers and the finger 34 is accordingly shaped to provide a hanger 44 on which an upper may rest easily as indicated in dotted lines on Fig. 4.

A plurality of cross bars, 45, 46, 47 and a pair of rails 48 define an endless track upon which the cars travel. The cars are supported in the track by the rails 48 which enter grooves suitably formed in the sides of the bases 30. Pivotally secured to each car base 30 near the leading end thereof is a yoked post 49 which is attached to the chain 25 and by which the cars are drawn along the track and around the ends thereof. In order to permit the free travel of the posts around the sprockets with the chain, suitably located gaps are provided in the edges of the sprockets to receive the posts.

Arranged at intervals along the upper conveyer are stations 50 at which the work is received from and delivered to the fingers 34. Each station comprises a platform 51 which extends across the frame into the path of travel of the cars 28 the rollers 39 thereof passing freely over the platform. The platform 51 (see Fig. 5) is substantially rectangular and is supported upon a pillar 52 (see Fig. 4). Two cross bars 45 are fixed to flanges 53 projecting downwardly from the front and rear edges of the platform. In the platform is provided, adjacent the front and rear edges, an elongated ovate aperture 54 and a circular aperture 55. Between the head sprocket 26 and the platform of the station 50 nearest such sprocket is mounted the cross bar 46 (see Fig. 7) which is secured to and spans the rails 48. The cross bars 47 (see Fig. 6) are secured to a side pair of rails 48 at the other side of the right station and at both sides of the other stations. Each of these cross bars includes an arm 56 which projects over the rails 48 and serves as a support on which is pivoted a cam piece 57 which forms a part of a car actuating mechanism described hereinbelow.

Each cam piece 57 is pivotally secured at one end to an arm 56 and upon the other end, which rests upon the platform 51, is secured a cam plate 58. As shown in the drawings each station 50 with the exception of that at the left end in Fig. 1 is provided with two cam pieces but since the construction and operation of the pieces is the same only one will be described in detail although the same reference characters will be applied in the drawings to corresponding elements of other pieces. Fixed in the aperture 55 is a stud 59 and through the aperture 54 extends a rod 60. The upper end of the rod 60 is connected by links 61 and 62 respectively to the stud 59 and to a stud 63 carried by a tongue 64 projecting toward the rod 60 from the cam piece 57 adjacent the outer end of the cam plate 58.

Each rod 60 extends through a hole 65 in the top 66 of the table 23 and is held normally in the upper or inoperative position by a spring 67 surrounding the rod between two washers 68. The rod is drawn down to the operative position by any suitable means under the control of an operator. For example a cord 70 passed around pulleys 71 is connected at one end to a loop 72 at the lower end of the rod and at the other end to a bar 73 hinged to the table adjacent the operator in such position that it may be tripped by the operator's knee. The lowering of the rod 60 shifts the cam piece 57 on its pivot until the cam plate 58 is brought into the path of travel of a car, the result being that it engages a roller 39 and tilts the lever 32 into the position shown at the right in Fig. 4 and the work is delivered all as will be pointed out hereinbelow in the description of the operation.

The head sprocket 26 (see Fig. 3) is mounted upon a shaft 75 supported in bearings carried by the table top 66, and driven from any suitable source of power as for example through the wheel 76. Surrounding the shaft 75 above the table is a tube 77 supported on a standard 78 carried by the table 66. Fixed to the tube 77 is a platform 79 on which is supported a cross bar 80 the ends of which support the outer rail 48. The sprocket 26 includes a hub 81 and sleeve 82 fixed to the shaft 75. Resting upon the sleeve 82 is a bracket 83 which supports the inner rail 48. Fittings 84 in the cross bar 80 and bracket 83 permit the introduction of grease or other lubricant to the shaft 75.

The secondary conveyer 21 comprises two parallel endless belts 90 which travel in parallel vertical planes, the upper runs passing through troughs 91 supported above the table top 66 at opposite sides of the pillars 52 and tube 77 upon cross brackets 92. The belts travel about head and foot pulleys 93, 94 driven from any suitable source of power (not shown) as through a drive wheel 95 attached to the head pulley 93. Suitably located idler rollers 96 supported by the brackets 92 bear against the lower runs of the belts and insure the proper tension thereof.

The illustrated embodiment is, as pointed out above, adapted for use in the stitching room of a shoe factory for transporting uppers and other parts of shoes between operators. The conveyers may travel in either direction but for ease in description it may be assumed that the primary conveyer travels in a clockwise direction and that the upper run of the secondary conveyer, referring to Fig. 1, travels from left to right. The operator at bench 24 in the upper left hand corner of Fig. 1 places uppers (see Fig. 4) upon the hangers 44 of the cars as they pass. The succeeding operator ready to treat an upper presses the station bar 73 adjacent her bench to depress the rod 60 and swing cam plate 58 of that station into the path of travel of a loaded car. As the car travels through the station the swung cam plate raises the lever of the car and tips the finger 34 so that the work thereon drops off the hanger onto the operator's bench. After the upper has been stitched or otherwise treated, if other operations are to be performed upon it the upper is placed upon the empty hanger of a passing car by which it is transported. As this car approaches the station in front of the bench at which a further operation is to be performed the operator if ready depresses a rod 60 and causes the work to drop from the car in the manner just described. When the operations on the upper have been completed it is dropped by the finishing operator upon one of the belts 90 of the secondary conveyer. The belt carries the upper away from the table 23 and drops it into a box or other receptacle (not shown) beyond the head pulley 93. It will be noted that the cars normally travel undisturbed and that in case an operator is not ready to treat certain uppers such uppers may be represented to that operator's bench until removed from the cars.

Figure 11:
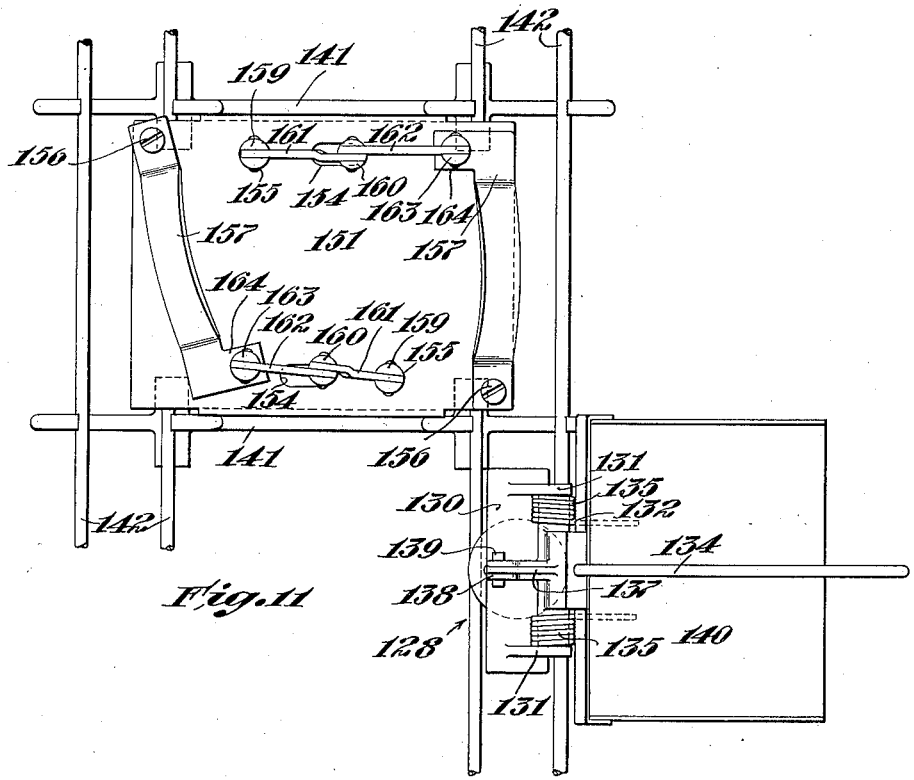
Fig. 11 is a plan view of the station disclosed in Fig. 10 and a car approaching such station.
Figure 12:
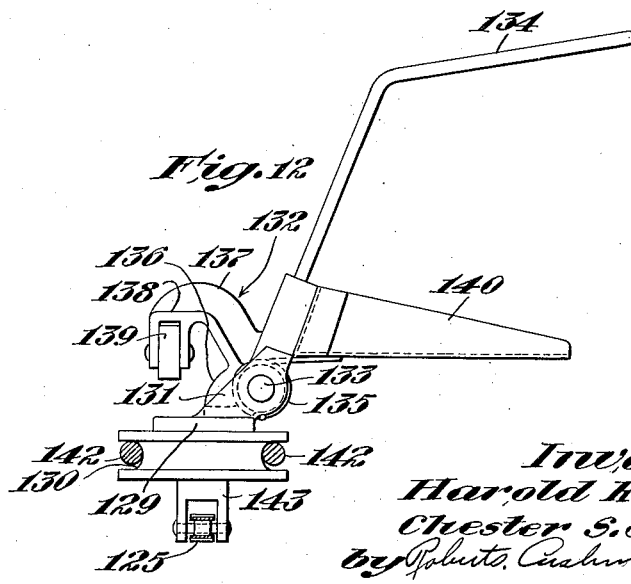
Fig. 12 is a side elevation of a car.

The embodiment illustrated in Figs. 8 to 12 inclusive is generally similar to that previously described but differs therefrom in certain features which will be described in detail. This system comprises a primary conveyer 120, a secondary conveyer 121, a tertiary conveyer 122, and a table 123 along the sides of which are provided, longitudinally of the conveyers, work benches 124 for the operators.

The conveyers 120 and 121 like the conveyer 20 of the previously described embodiment each comprise an endless chain 125 which travels in a horizontal plane about a head sprocket 126 and a foot sprocket 127. Longitudinally spaced cars 128 are secured to the chains, each car comprising a base 129, having grooves 130 in the edges thereof, ears 131 carried by the platform, a lever 132 pivotally supported on a shaft 133 carried by the ears, and a finger 134 carried by the lever. The lever 132 includes a pair of sleeves 135, a foot 136 and an arm 137 terminating in a yoke 138 by which a roller 139 is supported. The sleeves 135, foot 136, arm 137 and yoke 138 may or may not be integral with the lever. Mounted upon the lever 132 is a pan 140. As will be pointed out below, the work is carried by the cars either on the fingers 134 or in the pans 140.

Mounted upon crossbars 141, suitably spaced along the path of travel of the conveyer chains, are rails 142 which form an annular track for the cars. As shown particularly in Fig. 10, the rails enter the grooves 130 formed in the edges of the base 129 and thus control the travel of the cars around the track. Depending from the base 129 near the leading end thereof is a pivotally mounted post 143 terminating in a yoke by which the post is attached to the chain 125 so that the car is drawn along the rails 142.

Arranged at intervals along the primary and secondary conveyers in front of the work benches 124 are stations 150 at which the work is received from and delivered to the cars 128. Each station 150 like the stations 50 of the previously described embodiment comprises a platform 151 having elongated ovate apertures 154 and circular apertures 155 and cam pieces 157. The cam pieces one at each side of the platform rest on the platform and are pivotally secured thereto at one end by a pin 156. Fixed in the apertures 155 are studs 159 and through the apertures 154 extend rods 160, the upper ends of which are connected by links 161 and 162 to the studs 159 and to studs 163 carried by tongues 164 projecting from the cam pieces 157. The rods 160 are normally held in the upper position by springs 167 and may be drawn down to the lower position by means of hinged bars 173 so located that they may be tripped by the knees of the operators. The normal position of the cam pieces 157 is out of the path of travel of the cars as shown at the left in Fig. 11. When a rod 160 is drawn down by the tripping of a bar 173 the cam member associated therewith is swung into the path of travel of the cars, as shown at the right in Fig. 11. The roller of the approaching car follows the path defined by the cam piece so that the contents of the pan 140 are dumped onto the work bench of the operator who tripped the bar 173.

The tertiary conveyer 122 here shown comprises pairs of conveyer belts 175 arranged to travel in troughs 176 in vertically parallel planes and driven from a suitable source of power (not shown). The head pulleys 126 are also driven by any suitable means.

As indicated on Fig. 9 the illustrated embodiment is adapted for use in the stitching room of a shoe factory where the operations designated as Vamp, Braid and Fold are performed. The group designated by "Vamp" place work in the cars of the primary conveyer 120; the group designated by "Braid" receive the work from cars of the primary conveyer 120 and place it in the cars of the secondary conveyer 121; and the group designated by "Fold" receive the work from the cars of the secondary conveyer 121 and place it on one of the conveyer belts 175 of the tertiary conveyer 122.

As the operators complete the vamping operation the uppers are hung on the fingers 134 and any miscellaneous parts or material are placed in the pans 140 of the continuously traveling cars by which they are carried to the operators at the braiding stations. When an operator at a braiding station is ready for more work the bar 173 is tripped so that the next car arriving at that station will dump the uppers on the finger and parts in the pan upon the bench. After the braiding operation is completed the uppers are again hung on the fingers 134 and any other parts placed in the pans 140 of cars on the conveyer 121 carried by the cars to the benches of the folding operators and dumped at the benches of those operators who have tripped the bars 173. As these operators finish their work the uppers are placed on one of the conveyer belts 175 of the conveyer 122 and delivered thereby to a container or receptacle not shown.

While certain embodiments and uses of this invention have been shown and described, we are not limited thereto since other embodiments and uses may be made without departing from the spirit and scope of the invention as set forth in the following claims.

We claim:

1. A conveyer comprising an endless chain traveling in a horizontal plane, a track, a plurality of cars pivotally secured to said chain, said cars including a base, an article-carrying member pivotally secured thereto, and a roller fixed to said member, means for actuating said chain and causing it to move said cars around said track, and a station past which said cars travel, said station including a cam piece normally out of the path of travel of the cars, and means for moving the cam piece into such path so that, as a car passes the station, the cam piece engages the roller of the car and tilts the article-carrying member thereof to dump the load thereon at said station.

2. A conveyer comprising an endless chain traveling in a horizontal plane, a track, a plurality of cars pivotally secured to said chain, said cars including a base, an article-carrying member pivotally secured thereto, and a roller fixed to said member, means for actuating said chain and causing it to move said cars around said track, and a station past which said cars travel, said station including a platform, a cam piece pivoted thereto and movable into and out of the path of travel of the cars past said station, means for normally holding said cam out of such path and means for moving said cam piece into such path, so that, as a car passes the station, the cam piece engages the roller of the car and tilts the article-carrying member thereof to dump the load thereon at said station.

3. A conveyer comprising an endless chain traveling in a horizontal plane, a track formed by continuous rails, a plurality of cars pivotally secured to said chain, said cars including a base having grooves therein which receive said rails, an article-carrying member pivotally secured to said base and a roller fixed to said member, means for actuating said chain and causing it to move said cars around said track with the bases thereof in engagement with said rails, and a station past which said cars travel, said station including a platform which projects over said rails into the path of travel of said cars, a cam piece resting upon said platform and movable thereover into and out of the path of travel of the cars, means normally holding said cam piece out of such path and means for moving said cam piece into such path, so that, as a car passes the station, the cam piece engages the roller of the car and tilts the article-carrying member thereof to dump the load thereon at said station.

4. A conveyer comprising an endless chain traveling in a horizontal plane, a track formed by continuous rails, a plurality of cars pivotally secured to said chain, said cars including a base having grooves therein which receive said rails, an article-carrying member pivotally secured to said base and a roller fixed to said member, means for actuating said chain and causing it to move said cars around said track with the bases thereof in engagement with said rails, and a station past which said cars travel, said station including a platform which projects over said rails into the path of travel of said cars, a pivotally mounted cam piece resting upon said platform and movable thereover into and out of the path of travel of the cars, means normally holding said cam piece out of such path and means for moving said cam piece into such path, so that, as a car passes the station, the cam piece engages the roller of the car and tilts the article-carrying member thereof to dump the load thereon at said station.

5. A conveyer comprising an endless chain traveling in a horizontal plane, a track therefor including a pair of parallel rails between which the chain travels, a plurality of cars secured to said chain and riding upon said track rails, each said car including a base located between the rails and an article carrying member movably secured to said base and normally held in an operable position and including an outwardly projecting arm, means for causing the chain to move the cars along the track, stations past which said cars travel, each of said stations including a platform over which the arm of the article-carrying member passes freely, and means movable over the platform from an idle position to a position of engagement with the arm to tilt positively the member upon the arrival of the car causing the member to dump any load thereon at the station.

6. A conveyer comprising an endless chain traveling in a horizontal plane, a track therefor including a pair of parallel rails between which the chain travels, a plurality of cars secured to said chain and riding upon said track rails, each said car including a base located between the rails and an article carrying member movably secured to said base and normally held in an operable position and including an outwardly projecting arm, means for causing the chain to move the cars along the track, stations past which said cars travel, each of said stations including a platform over which the arm of the article-carrying member passes freely, and a cam movable over the platform from an idle position to a position in which it positively engages the arm and positively tilts the member upon the arrival of the car causing the member to dump any load thereon at the station.

7. A conveyer comprising an endless chain traveling in a horizontal plane, a track therefor including a pair of parallel rails between which the chain travels, a plurality of cars secured to said chain and riding upon said track rails, each said car including a base located between the rails and an article carrying member pivotally secured to said base and normally held in an operable position and including an outwardly projecting arm and a roller carried thereby, means for causing the chain to move the cars along the track, stations past which said cars travel, each of said stations including a platform over which the arm and roller of the article carrying member pass freely and means movable over the platform from an idle position to a position of engagement with the roller to tilt positively the member upon the arrival of a car causing the member to dump any load thereon at the station.

8. A conveyer comprising an endless chain traveling in a horizontal plane, a track therefor including a pair of parallel rails between which the chain travels, a plurality of cars secured to said chain and riding upon said track rails, each said car including a base located between the rails and an article carrying member pivotally secured to said base and normally held in an operable position and including an outwardly projecting arm and a roller carried thereby, means for causing the chain to move the cars along the track, stations past which said cars travel, each of said stations including a platform over which the arm and roller of the article carrying member pass freely and a cam movable over the platform from an idle position to a position in which it engages the roller and positively tilts the member upon the arrival of a car causing the member to dump any article thereon at the station.

9. A conveyer comprising an endless chain traveling in a horizontal plane, a track therefor including a pair of parallel rails between which the chain travels, a plurality of cars secured to said chain and riding upon said track rails, each said car including a base located between the rails and having grooves in the sides thereof which receive the rails, an article-carrying member pivotally secured to the base and normally held in an operable position and a foot carried by said member and resting upon said base when the member is in its normal position, means for causing said chain to move the cars along the track, stations past which said cars travel, each of said stations including a platform over which a portion of the article-carrying member of the car passes freely, and means movable over the platform from an idle position to a position of engagement with that portion of the member to tilt the latter upon the arrival of the car and cause it to dump any load thereon at the station.

10. A conveyer comprising an endless chain traveling in a horizontal plane, a track therefor including a pair of parallel rails between which the chain travels, a plurality of cars pivotally secured to said chain and riding upon the track rails, said cars each including a base, located between the rails, an article-carrying member pivotally secured to the base, and a foot carried by said member and normally resting upon said base, means for actuating said chain and causing the latter to move the cars along said track, stations past which said cars travel, each of said stations including a platform over which a portion of the car passes freely when the foot rests upon the base and means movable thereover by which the article-carrying member is tilted to dump the load thereon.

HAROLD R. PERRY.
CHESTER S. JENNINGS.